United States Patent

Schneider et al.

[11] Patent Number: 5,842,730
[45] Date of Patent: *Dec. 1, 1998

[54] SPARE TIRE STORAGE COMPARTMENT COVER

[75] Inventors: Werner H. Schneider, Waterford; Sudhakar Kodali, Auburn Hills, both of Mich.

[73] Assignee: Chrysler Corporation, Auburn Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 731,198

[22] Filed: Oct. 7, 1996

[51] Int. Cl.⁶ ........................................... B60R 5/04
[52] U.S. Cl. .................................. 296/37.3; 296/37.16
[58] Field of Search ..................... 296/37.3, 37.16, 296/37.2; 160/230, 231.1, 231.2

[56] References Cited

U.S. PATENT DOCUMENTS

| | | |
|---|---|---|
| 2,631,886 | 3/1953 | Keller . |
| 3,325,207 | 6/1967 | Anderson et al. . |
| 4,351,555 | 9/1982 | Hashimoto . |
| 4,398,765 | 8/1983 | Ishikawa . |
| 4,423,900 | 1/1984 | Sugimoto et al. . |
| 4,536,025 | 8/1985 | Yamawaki et al. . |
| 4,687,124 | 8/1987 | Mahr . |
| 4,711,046 | 12/1987 | Herrgord ................................ 40/605 |
| 4,830,241 | 5/1989 | Ulmer et al. . |
| 4,848,826 | 7/1989 | Kuwabara et al. ................. 296/97.23 |
| 4,991,898 | 2/1991 | Nomura . |
| 5,050,926 | 9/1991 | Tanaka . |
| 5,056,846 | 10/1991 | Tanaka . |
| 5,056,858 | 10/1991 | Tanaka . |
| 5,061,002 | 10/1991 | Saso . |
| 5,080,417 | 1/1992 | Kanai . |
| 5,238,284 | 8/1993 | Whitaker ............................... 296/37.16 |
| 5,257,846 | 11/1993 | Kanai et al. . |
| 5,515,900 | 5/1996 | West et al. ............................. 160/135 |

FOREIGN PATENT DOCUMENTS

| | | |
|---|---|---|
| 61-75035 | 4/1986 | Japan . |
| 6175036 | 4/1986 | Japan . |
| 61-249850 | 11/1986 | Japan . |
| 6247211 | 9/1994 | Japan . |

*Primary Examiner*—David M. Mitchell
*Attorney, Agent, or Firm*—Roland A. Fuller, III

[57] ABSTRACT

A spare tire storage compartment cover has at least two sections joined by a living hinge. When the cover is in place over the spare tire storage compartment, it is held in place by a conventional tie-down mechanism that secures the first section in place. The second section, located toward the rear of the vehicle when the cover is in place, can be rotated relative to the first section to allow access to the spare tire storage compartment. The first and second sections are preferably formed from wood, such as composition board, and a carpet is secured to both sections in conventional fashion, such as by clips. The carpet provides the living hinge joining the first and second sections.

8 Claims, 1 Drawing Sheet

5,842,730

SPARE TIRE STORAGE COMPARTMENT COVER

This invention relates to covers for spare tire storage compartments in trunks of vehicles, and more particularly, to a spare tire storage compartment cover that allows easy access to the compartment in which the spare tire is stored to facilitate the use of unused space in that compartment as additional storage area in the trunk.

BACKGROUND

In automobiles having trunks, the spare tire is often stored in a compartment formed in the bottom of the trunk, such as a well formed in the bottom of the trunk. The spare tire storage compartment is typically covered with a flat cover, made of composition board or other rigid material. When in place, the spare tire storage compartment cover is flush with the floor of the trunk surrounding the spare tire storage compartment and forms a portion of the floor of the trunk, usually a major portion. The cover is secured by a tie-down mechanism. Where the floor of the trunk is carpeted, the cover may also be covered by carpet.

The spare tire storage compartment often has unused space around the spare tire that could be used for storage. The problem with using this space for storage is that the spare tire storage compartment is not easily accessible in that the relatively large spare tire storage compartment cover must be removed to access it. Since the cover often forms a major portion of the floor of the trunk, the trunk must typically be emptied or nearly emptied to permit the cover to be removed. This is inconvenient and effectively precludes the use of the spare tire storage compartment as additional storage area.

It is an object of this invention to provide a spare tire storage compartment cover that permits ready access to the spare tire storage compartment by allowing the spare tire storage compartment to be accessed without removing the cover.

It is another object of this invention to provide a spare tire storage compartment cover that has at least two sections joined by a living hinge permitting easy access to the spare tire storage compartment by opening one of the two sections.

SUMMARY

A spare tire storage compartment cover in accordance with this invention has at least two sections joined by a living hinge. When the cover is in place over the spare tire storage compartment, it is held in place by a conventional tie-down mechanism that secures the second section in place. The first section, located toward the rear of the vehicles when the cover is in place, can be rotated relative to the second section to allow access to the spare tire storage compartment. The first and second sections are preferably formed from wood, such as composition board, and a carpet is secured to both sections in conventional fashion, such as by clips. The carpet provides the living hinge joining the first and second sections.

BRIEF DESCRIPTION OF THE DRAWING

Additional features and advantages of the invention will become apparent to those skilled in the art upon consideration of the following detailed description of a preferred embodiment exemplifying the best mode of carrying out the invention as presently perceived.

The detailed description particularly refers to the accompany figure in which.

DETAILED DESCRIPTION OF A PREFERRED EMBODIMENT

Figure 1:
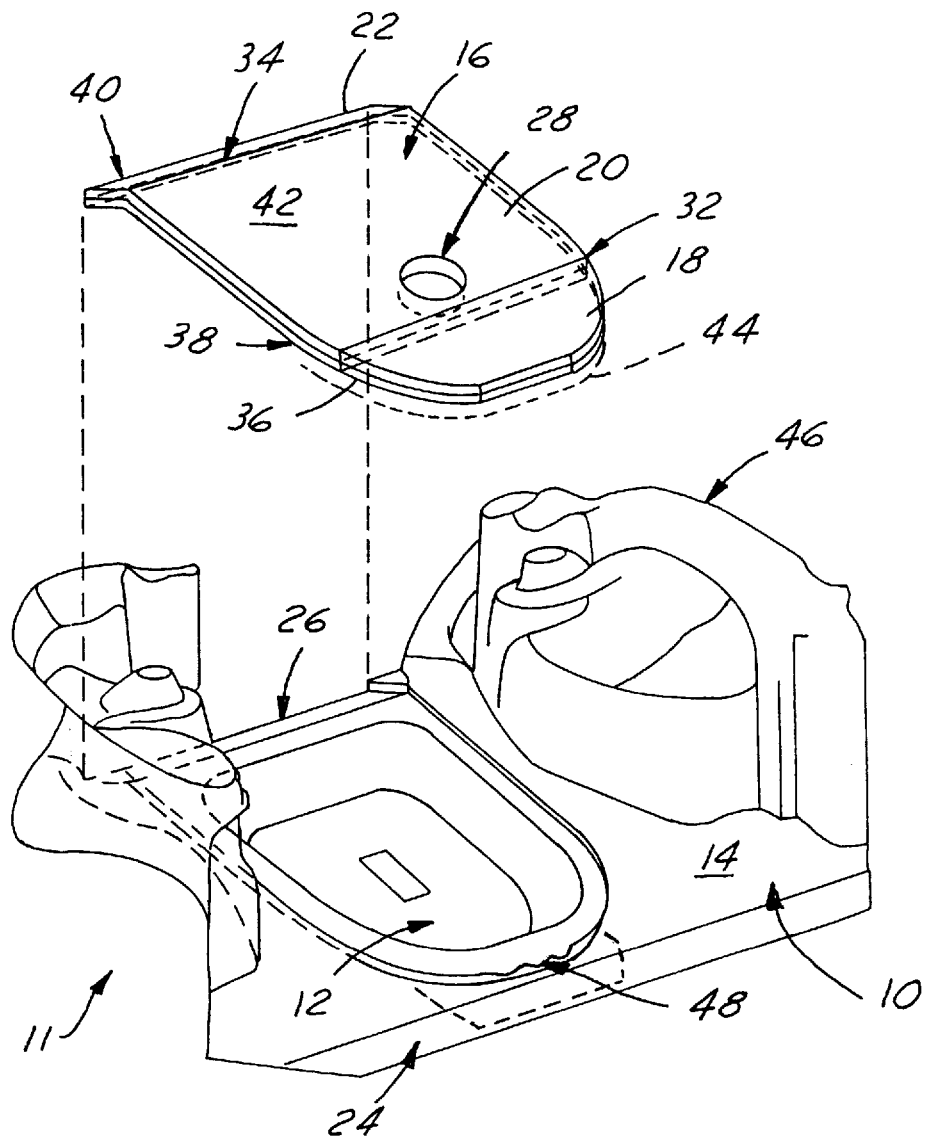
FIG. 1 is a perspective view of a spare tire storage compartment cover in accordance with this invention.

Referring to FIG. 1, a trunk 10 of a vehicle 11 has a spare tire storage compartment 12 formed as a well in the bottom of trunk 10. Trunk 10 has a floor 14. A layer of carpet 46 is affixed to the surface of floor 14 in conventional fashion, such as by clips. In the embodiment shown in FIG. 1, a spare tire storage compartment cover 16 has a first end section 18, a middle section 20, and a second end section 22. Alternatively, second end section 22 can be eliminated and middle section 20 enlarged accordingly so that cover 16 comprises first end section 18 and middle section 20. When cover 16 is in place over spare tire storage compartment 12, first end section 18 is adjacent a rear 24 of trunk 10 and second end section 22 is adjacent a front 26 of trunk 10. When cover 16 is in place, it is flush with the floor 14 of trunk 10 that surround spare tire storage compartment 12 and forms a relatively major portion of the floor 12 of trunk 10.

First end section 18 is hingedly joined to middle section 20 by a living hinge at 32. Second end section 22 is hingedly joined to middle section 20 either by conventional hinges or by a living hinge at 34.

In a preferred embodiment, first end section 18, middle section 20 and second end section 22 are formed by corresponding sheets of wood 36, 38, 40, such as composition board, with a layer of carpet 42 affixed, in conventional fashion such as by clips, to the top surfaces of sheets 36, 38, 40. The carpet provides the living hinge between first end section 18 and middle section 20 and second end section 22 and middle section 20. To provide additional strength, a second layer of carpet 44 can be affixed to the bottom surfaces of sheets 36, 38, 40.

In an alternative embodiment, first end section 18, middle section 20 and second end section 22 are formed from a sheet of plastic that is formed to provide a living hinge at 32 and at 34. Carpet 42 is affixed over the top surface of the plastic sheet and also provides living hinges at 32 and 34, which strengthens the living hinges at 32 and 34.

Cover 16 is secured in place over spare tire storage compartment 12 in conventional fashion by the use of a conventional tie-down mechanism (not shown) that extends through an access hole 28 in middle section 20. When cover 16 is in place, spare tire storage compartment 12 can be readily accessed by opening first end section 18 by rotating it upwardly with respect to middle section 20. To facilitate grasping of first end section 18, indentations 48 can be provided in the floor 14 of trunk 10 at the rear of spare tire storage compartment 12, which may be formed in the edge of carpet 46 that is adjacent first end section 18 at the rear of spare tire storage compartment 12.

While it is conventional to remove cover 16 when it is desired to fully open spare tire storage compartment 12, such as when removing a spare tire (not shown), second end section 22 can be secured to the front of trunk 10 and middle section 20 rotated upwardly with respect to second end section 22 to allow the spare tire storage compartment 12 to be fully opened.

Although the invention has been described in detail with reference to certain preferred embodiments and specific examples, variations and modifications exist within the scope and spirit of the invention as defined in the following claims.

What is claimed is:

1. A spare tire compartment cover for a spare tire compartment that is positioned beneath the floor of a vehicle trunk and open to the trunk when not covered by the cover, the cover comprising:

a. a forward end section, a middle section, and a rear end section;

b. a first hinge joining the forward end section to the middle section and a second hinge joining the rear end section to the middle section;

c. the middle section and rear end section covering substantially the entire spare tire compartment when the spare tire compartment cover is in place in a trunk of a vehicle and the rear end section covering a portion of the spare tire compartment;

d. the middle section and rear end section liftable about the hinge joining the front end section with the middle section to expose substantially the entire spare tire compartment; and e. the rear end section liftable about the hinge joining the middle section to the rear end section to expose a portion of the spare tire compartment.

2. The cover of claim 1, and further comprising the rear end section also covering a portion of the trunk floor adjacent a rear of the spare tire compartment.

3. The cover of claim 1 and further comprising the front end section also covering a portion of the trunk floor adjacent a front of the spare tire compartment.

4. The cover of claim 1 wherein the front end section, the middle section and the rear end section are made from sheets of generally rigid material, a first layer of carpet covering and affixed to top surfaces of the front end, middle and rear end sections, the first layer of carpet providing living hinges between the front end and middle sections and between the rear end and middle sections.

5. The cover of claim 4 and further including a second layer of carpet covering and affixed to bottom surfaces of the front end, middle and rear end sections, the second layer of carpet providing living hinges between the front end and middle sections and between the rear end and middle sections.

6. The cover of claim 1 wherein the front end, middle and rear end sections are formed from a sheet of plastic formed to include living hinges between the front end and middle sections and between the middle and rear end sections.

7. The cover of claim 6 and further including a first layer of carpet covering and affixed to top surfaces of the front end, middle and rear end sections, the first layer of carpet also providing living hinges between the front end and middle sections and the rear end and middle sections.

8. The cover of claim 7 and further including a second layer of carpet covering and affixed to bottom surfaces of the front end, middle and rear end sections, the second layer of carpet also providing the living hinges between the front end and middle sections and the rear end and middle sections.

\* \* \* \* \*